(12) United States Patent
Mueller et al.

(10) Patent No.: US 6,300,746 B1
(45) Date of Patent: Oct. 9, 2001

(54) METHOD FOR REGULATING A GENERATOR

(75) Inventors: Wolfgang Mueller, Stuttgart; Bernd Dittmer, Ludwigsburg-Ossweil; Richard Schoettle, Muehlacker; Oliver Luz, Esslingen, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,432

(22) PCT Filed: May 16, 1998

(86) PCT No.: PCT/DE98/01369

§ 371 Date: Mar. 26, 1999

§ 102(e) Date: Mar. 26, 1999

(87) PCT Pub. No.: WO99/07056

PCT Pub. Date: Feb. 11, 1999

(30) Foreign Application Priority Data

Aug. 1, 1997 (DE) .............................. 197 33 221

(51) Int. Cl.⁷ .................................................. H02H 9/14
(52) U.S. Cl. .................. 322/29; 322/28; 322/59
(58) Field of Search .................. 322/28, 29, 31, 322/59

(56) References Cited

U.S. PATENT DOCUMENTS

| | | | | |
|---|---|---|---|---|
| 5,061,889 | * | 10/1991 | Iwatani et al. | 322/28 |
| 5,880,577 | * | 3/1999 | Aoyama et al. | 322/29 |
| 5,998,976 | * | 12/1999 | Steffan | 322/10 |
| 6,037,753 | * | 3/2000 | Uematsu et al. | 322/29 |
| 6,060,866 | * | 5/2000 | Sada et al. | 322/59 |

OTHER PUBLICATIONS

"Elektrische Motorausruestung", by G. Henneberger, published by Vieweg–Verlag, pp. 54–57.

* cited by examiner

Primary Examiner—Elvin Enad
Assistant Examiner—Peter Medley
(74) Attorney, Agent, or Firm—Michael J. Striker

(57) ABSTRACT

A method for regulating a generator is described in which the rectified output voltage furnished by the generator is converted, under certain preconditions, with the aid of a direct voltage converter. The generator can be operated either in a free operating mode or a regulated operating mode. If the generator voltage output in the particular operating state is not equivalent to the on-board electrical voltage, then the generator voltage is either raised or lowered with the aid of the voltage converter. The selection of the generator operating mode is done as a function of rpm or voltage, in such a way that the available generator power or energy conversion efficiency is as high as possible.

8 Claims, 3 Drawing Sheets

METHOD FOR REGULATING A GENERATOR

The invention is based on a method for regulating a generator, in particular a three-phase generator that can be driven by an internal combustion engine in a motor vehicle, as generically defined by the preamble to the main claim.

PRIOR ART

To generate the electrical energy needed in the motor vehicle, claw pole generators are typically used today. These claw pole generators are three-phase generators, whose output current is rectified with the aid of a diode bridge and is used both for supplying the electrical consumers of the vehicle and for charging the battery.

A three-phase generator of this kind includes a field coil, through which field current flows. The field current is regulated with the aid of a voltage regulator in such a way that the output voltage of the generator is approximately constant, regardless of the rpm of the generator. In the stator windings of the generator, it is known that an rpm-dependent voltage is induced that drives a current through the rectifier bridge. The output current of the generator together with the generator voltage produces the power furnished by the generator. In FIG. 1, the generator power P(kW) of a claw pole generator, at UGN=14 V, it plotted over the generator rpm n(1/min) at different output voltages Ub. The maximum output power as a function of the generator rpm extends along the tangent line T. It is along this line that the utilization C=P/n of the generator is highest. The power per rpm is accordingly at a maximum on the tangent line T.

From the Bosch publication entitled "Elektrische Motorausrüstung" [Electric Motor Equipment] by G. Henneberger, published by Vieweg-Verlag, p. 55, it is known that generators in operation with free voltage (free generator mode) produce higher output capacities at a corresponding terminal resistance than in the mode with regulation to a constant 14 V output voltage. Yet a free generator mode is not readily possible, since generator output voltages could arise then that could considerably impair the on-board electrical consumers.

ADVANTAGES OF THE INVENTION

The method of the invention for regulating a generator as defined by the characteristics of claim 1 has the advantage that the power range of the generator is better exploited.

These advantages are attained in that the exciter current of the generator is not regulated in a lower generator rpm range, so that the generator then operates in the free mode. Above a predeterminable rpm, the field current is regulated, so that excessively high generator voltages do not result.

Further advantages of the invention are attained by the characteristics recited in the dependent claims. It is especially advantageous that the rpm beginning at which the regulation of the exciter voltage is performed is an rpm at which the generator voltage is approximately equivalent to the on-board electrical voltage. This assures that regulation of the field current begins before excessively high generator voltages become possible. Since in the free generator mode at low rpm operation along the tangent line is possible, a maximum rate of increase of the power as a function of the available generator rpm can be attained. By using direct voltage converters that convert the output voltage of the generator to on-board electrical voltage, it is possible to adapt the generator to predeterminable conditions. If direct voltage converters which can function as both step-up converters and step-down converters are used, a further increase in generator power as a function of the available generator rpm is possible over a wide generator rpm range.

DRAWING

The invention is shown in the drawing and will be described in further detail in the ensuing description. Individually, FIG. 1, as already noted, illustrates the relationship between the effective power P and the generator rpm n for various on-board electrical voltages Ub;

Figure 5:
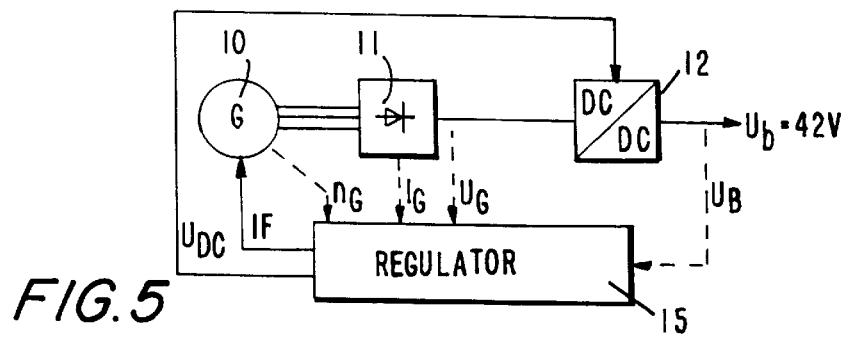

FIG. 5 a second block circuit diagram of a generator system according to the invention.

In FIGS. 4, 6, 7, 8 and 9, the effective power P is plotted above the generator rpm n for the various types of generator mode.

DESCRIPTION

Figure 1:
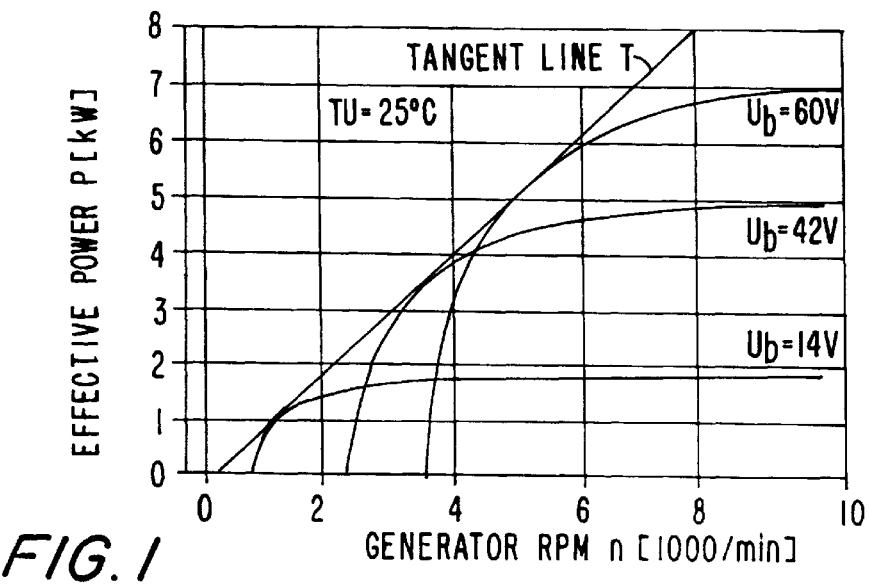

In FIG. 1, the known relationship between the effective power P of the generator and the generator rpm n for various on-board electrical voltages Ub is plotted for a claw pole generator with the generator voltage UGN=14 V. The tangent line T is also shown; ideally, the tangent line is a straight line from the origin that is as steep as possible and that touches the generator characteristic curve P(n) at the tangent point TP. The utilization C=P/n of the generator is highest along the tangent line.

Figure 2:
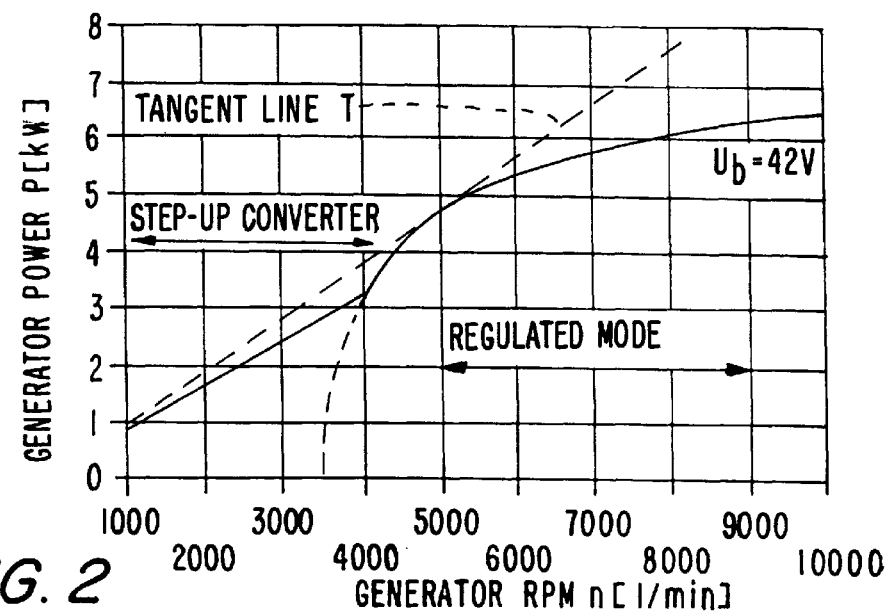
FIG. 2 shows the relationship between the generator capacitor P and the generator rpm n in the unregulated mode (below 4000 rpm) and in the regulated generator mode above 4000 rpm.
Figure 3:
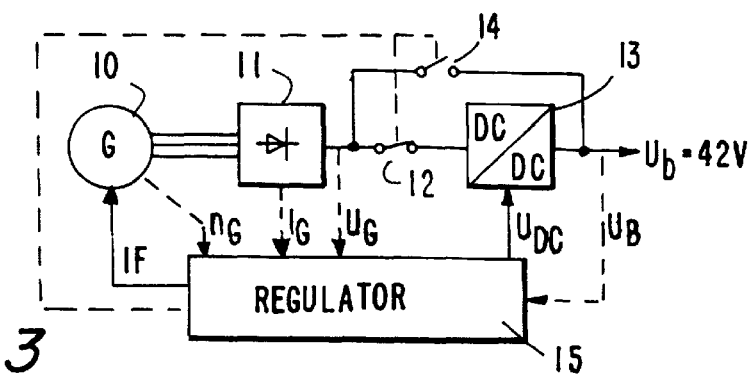
FIG. 3 shows a first block circuit diagram.

To make it possible for the effective power output by an alternating current generator, such as a claw pole generator, to be increased, the provisions described below in conjunction with FIGS. 2–9 are made. In particular, in the startup range or the lower rpm range, the generator is operated in the "free" generator mode. Once the on-board electrical voltage Ub is reached, for instance a 42 V on-board electrical voltage, the transition to the regulated mode takes place. In the regulated mode, the exciter current of the generator is varied by the regulating device in such a way that the output voltage of the generator constantly amounts to 42 V, regardless of the generator rpm. In the "free" generator mode range, that is, a range in which because of rpm the generator voltage is less than the on-board or battery voltage, a direct voltage converter (DC/DC converter) supplies the 42 V on-board electrical system, in the exemplary embodiments of FIGS. 3 and 5. A voltage converter of this kind is also known as a step-up converter. In the regulated generator mode, the DC/DC converter is not in operation. In FIG. 3, a block circuit diagram of a circuit conversion is shown for a first generator mode type, including the DC/DC converter coupling. The generator is designated by reference numeral 10 and is adjoined by the rectifier bridge 11, whose output can be connected to the DC/DC converter 13 via a switch 12. The voltage Ub appears at the output of the DC/DC converter 13. It is 42 V, for instance. The DC/DC converter 13 can be bypassed via a switch 14 and an associated line. The switch 12 and the switch 14 are actuated in a suitable way by the regulator 15. The regulator 15 furnishes the field current IF of the field winding, not shown, of the generator 10. The regulator 15 also furnishes a voltage UDC, which is delivered to the DC/DC converter 13. As input variables, the regulator 15 is furnished with the generator rpm nG, the generator current IG, the generator voltage UG, and the on-board electrical voltage Ub. With the aid of the regulator 15, the first generator mode type according to the invention is realized; this leads to the relationship shown in FIG. 2 between the generator power P and the generator rpm N. To that end, the regulator 15 furnishes the field current IF to the field winding of the generator and furnishes a set-point voltage UDC to the DC/DC converter 13.

With the arrangement shown in FIG. 3, a generator mode type can be realized that enables higher utilization of the power range of existing or easily modified (rewound mass production claw pole generators). The increasing demand for power on the part of vehicles in the future can thus be covered, and the higher generator voltage that might be needed in future on-board energy systems for motor vehicles can be furnished. If a step-up converter is used as the DC/DC converter, then even in the low rpm range of the generator, power can be drawn; in a generator regulated constantly to 42 V, that would not be possible until at much higher generator rpm levels.

As can be seen from FIG. 1, in a conventional passenger car generator at Ub=42 V, practically no power can be drawn below 2500 rpm. If conversely the output voltage of the generator ug is raised with the aid of a DC/DC converter that functions as a step-up converter, then even at a generator speed of 1000 rpm a generator power of virtually one kW can be drawn, and nearly 2 kW are already produced at 2300 rpm (see FIG. 2).

To make it possible to obtain the generator power P, indicated in FIG. 2 as a solid line, as a function of the generator rpm n for Ub=42 V, the switch 12 is closed and the switch 14 is opened at generator speeds of less than 4000 rpm. This puts the step-up converter 13 into operation. The triggering actions for the switches 12 and 14 are output by the regulator as soon as the regulator recognizes that the generator rpm ng is below 4000 rpm. A generator power can then be drawn which is only slightly below the generator power defined by the tangent line. The straight tangent line is not attained, since the step-up converter has an efficiency of only approximately 85%, for example. Once the generator reaches the speed of 4000 rpm, the regulator 15 outputs trigger pulses which open the switch 12 and close the switch 14, thus bypassing the DC/DC converter 13. A transition then ensues to the regulated generator mode, in which the field current of the generator is regulated in the usual way. The generator power then rises as a function of rpm.

In such an operating mode, in which the DC/DC converter is put into operation only intermittently, for instance during idling, upon startup and in a low rpm range, the system efficiency can be increased compared with a system configuration that has a permanently integrated DC/DC converter. The result is lower system costs, because of the limited power range that the DC/DC converter has to cover, compared with systems with permanently integrated DC/DC converters.

Figure 4:
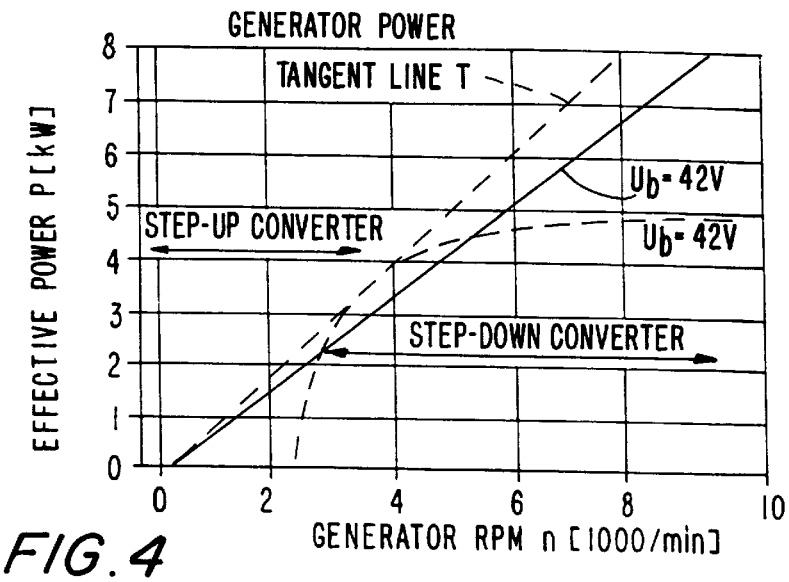

In FIG. 4, the generator power or effective power P is plotted as a function of the rpm at a 42 V on-board electrical voltage and with the use of a special DC/DC converter in the free generator mode. FIG. 5 shows the associated block circuit diagram for this type of generator mode and for the DC/DC converter coupling. The variables shown in FIG. 5 correspond to those already explained in conjunction with FIG. 3. The switches 12 and 14 of FIG. 3 are no longer present. The regulator 15 supplies the voltage UDC to the input of the DC/DC converter 12, to which the variable output voltage of the generator is also delivered. In order to increase the output power of the alternating current generator 10, which is designed for instance as a claw pole generator, this generator is operated in the free generator mode, that is, unregulated. In this unregulated mode, the output power of the generator rises linearly with the generator rpm n. In FIG. 4, the power characteristic curve is plotted as a solid line for Ub=42 V. In order for the voltage, to be furnished to the on-board electrical system, to have constant values of 42 V regardless of rpm in such a free generator mode, the DC/DC converter 12 must be wired such that it can function as a step-up converter or step-down converter. This voltage converter converts the variable input voltage supplied to its input to the constant on-board electrical voltage of 42 V. If the furnished voltage, applied to the input of the DC/DC converter 12, is less than 42 V, then the voltage converter must operate as a step-up converter. If the voltage is more than 42 V then the DC/DC converter must function as a step-down converter.

Figure 6:
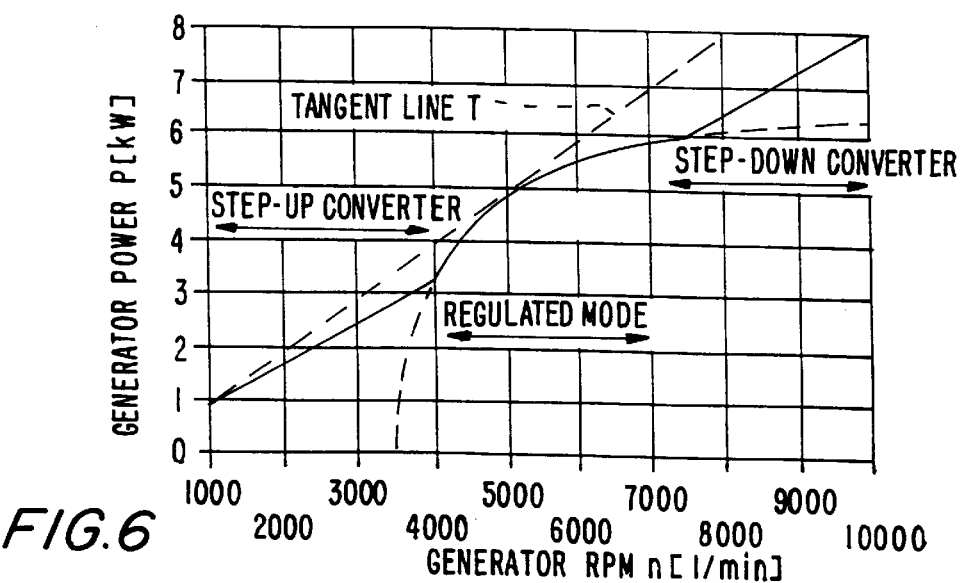

The maximum available generator power is determined by the straight line designed as tangent line T in FIG. 1. Admittedly, this output power cannot be attained in practice, since the DC/DC converter has a converter efficiency of 85%, for instance. As a result, the power curve shown as a solid line in FIG. 4 is obtained; at speeds below approximately 2800 rpm and above approximately 5100 rpm, this curve is above the conventional power characteristic curve for a passenger car generator where Ub=42 V. This generator mode type can also be employed with conventional or slightly modified mass-production claw pole generators. By using a DC/DC converter as a step-up converter or step-down converter, power can be drawn over virtually the entire rpm range of the generator; in a constantly regulated 42 V generator, this would not be possible until higher generator speeds. The DC/DC converter, which in this operating mode is always in operation, is capable in conjunction with the generator that is unregulated over the entire rpm range of outputting very high generator power levels in the upper rpm range, for example for systems that require high power levels in the upper rpm range. Another kind of generator mode, with which the output power of an alternating current generator, such as a claw pole generator, can be increased comprises operating the generator in the free generator mode in the startup range or lower rpm range. A downstream DC/DC converter, which operates as a step-up converter, supplies the on-board electrical system in this operating range. Once the 42 V on-board electrical voltage is reached, the transition to the regulated generator mode with a constant output voltage of 42 V takes place. This regulated mode extends between approximately 4000 and 7500 rpm, as FIG. 6 shows. If peak power levels in the high rpm range are needed, for instance for electrical valve voltage (EVS), the generator is switched over again with the aid of the voltage regulator 15 to the free generator mode; such a switchover can be made by suitable opening and closing of the switches 12, 14 of the circuit arrangement of FIG. 3.

Figure 7:
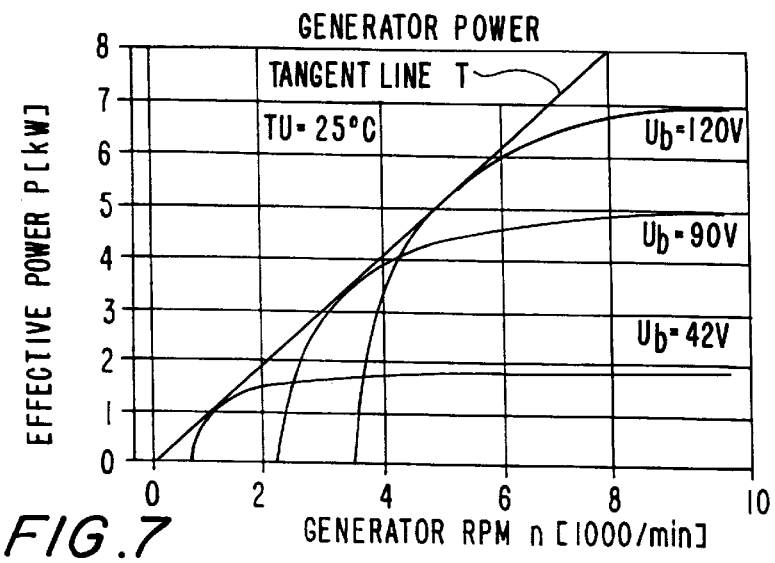
Figure 8:
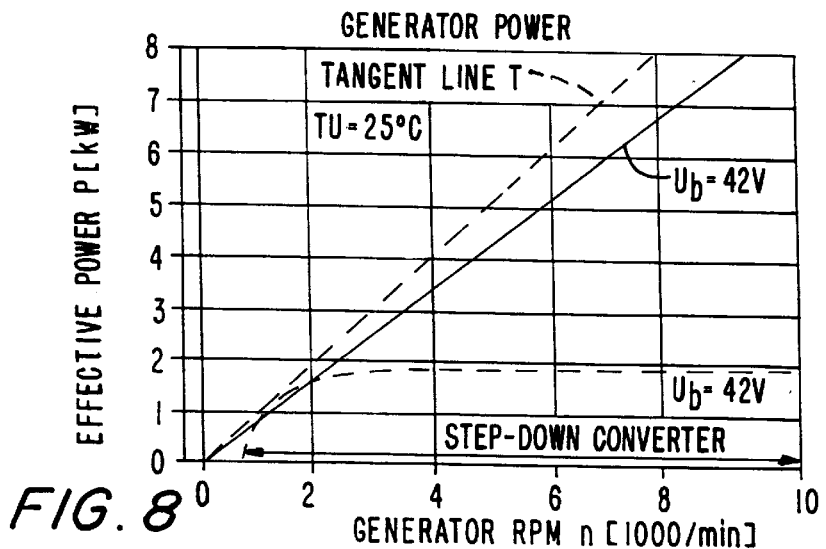

In a further exemplary embodiment of the invention a system is shown with which the output power of a claw pole generator can also be increased. Here the claw pole generator is operated with a different type of winding. This kind of rewound 42 V version of a claw pole generator is operated in the free generator mode. Since the output voltage of the generator, in typical rpm ranges, is already higher than 42 V, the downstream DC/DC converter is constructed as a step-down converter, which converts the variable input voltage supplied to it to the constant on-board electrical voltage of 42 V. In FIG. 7, the generator power of a rewound claw pole generator with UGN=42 V (generator voltage) is plotted over the generator rpm at various output voltages. The maximum output power as a function of the generator rpm extends along the tangent line T, as in conventional generators. It is along this line that the utilization C=P/n of the generator is highest. In the free generator mode along the tangent line, the output voltage varies virtually in proportion to the rpm. The generator current virtually constant. So that the possible output power for the 42 V on-board electrical voltage will be obtained, a step-down converter is used above approximately 1000 rpm. In FIG. 8, the possible generator power for Ub=42 V is shown as a solid line. The tangent line T is located only slightly above the power characteristic curve. The difference between them is due to the converter efficiency of 85%, for example. Compared with the generator characteristic curve for the regulated mode, plotted in dashes lines, it can be seen that above 2000 rpm, considerably more effective power is available. The associated circuit conversion corresponds to the circuit of FIG. 5.

In another type of generator mode according to the invention, with which the output power of an alternating current generator, such as a claw pole generator, can be increased, the generator is operated in an unwound 42 V version. The attainable effective power over the generator rpm is equivalent to that shown in FIG. 9. In the startup range or in the lower rpm range, the regulated generator mode is employed, and a 42 V on-board electrical voltage is generated. If peak power levels in the high rpm are needed, for instance in electrical valve control EVS, a switchover actuated by the regulator 15 to the free generator mode is made. In this operating range, the downstream DC/DC converter, which is wired as a step-down converter, supplies the on-board electrical system. The block circuit diagram of the associated circuit conversion is equivalent to the block circuit diagram of FIG. 3.

Figure 9:
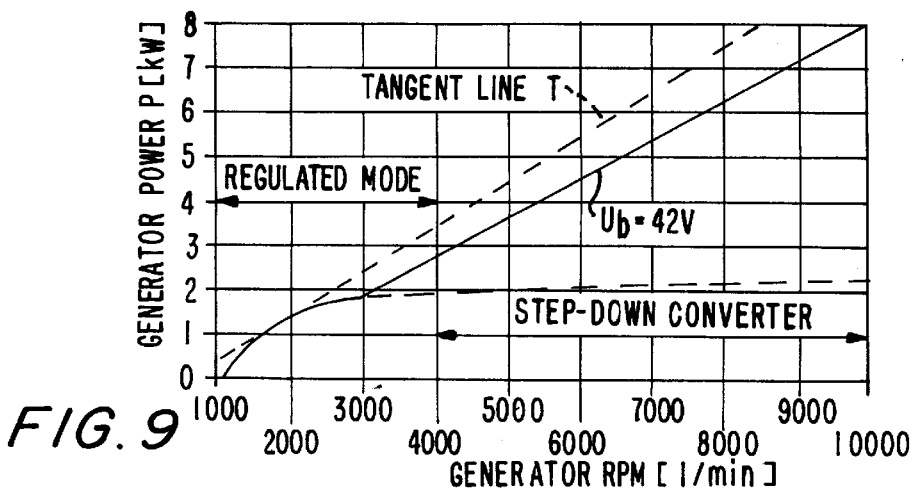

The possible output power for this type of generator mode is shown in FIG. 9. The solid line again represents the available generator power. In the regulated mode up to approximately 3000 rpm, a power is furnished that corresponds to the power, shown in FIG. 7, for the regulated mode at Ub=42 V. Above 3000 rpm, the available power rises rapidly, since the generator is operating in the "free" mode. It is distinguished from the maximum power plotted in the tangent line by the power that is lost as a consequence of the converter efficiency of 85%, for example. In this type of generator mode, the DC/DC converter is in operation only intermittently, namely to obtain the peak power levels in the high rpm range. The system efficiency is higher than in system configurations with permanently integrated DC/DC converters.

The exemplary embodiments of the invention have been described for on-board electrical voltages of 42 V, as an example. In principle, the operating modes described can be realized for arbitrary on-board electrical voltages.

What is claimed is:

1. A method for regulating a generator, in particular a three-phase generator, which can be driven by an internal combustion engine, with a field coil through which a field current flows, for generating the exciter field, and having stator coils, in which by flux changes alternating voltages are induced that generate currents that are carried via rectifiers to the consumers, the regulator delivers the field current to the field winding of the generator, and in selectable generator rpm ranges the field current remains unregulated, so that the generator then operates in the free mode, and a voltage converter converts the free voltage then furnished by the generator to predeterminable values.

2. The method for regulating a generator of claim 1, wherein the regulation is performed for optimized efficiency.

3. A method for regulating a generator, in particular a three-phase generator, which can be driven by an internal combustion engine, with a field coil through which a field current flows, for generating the exciter field, and having stator coils, in which by flux changes alterating voltages are induced that generate currents that are carried via rectifiers to the consumers, the regulator delivers the field current to the field winding of the generator, and in selectable generator rpm ranges the field current remains unregulated, so that the generator then operates in the free mode, and a voltage converter converts the free voltage then furnished by the generator to predeterminable values, and the selectable generator rpm range for free generator mode is limited by an upper and/or lower rpm, which corresponds to the rpm at which the generator voltage is equivalent to the on-board electrical voltage.

4. A method for regulating a generator, in particular a three-phase generator, which can be driven by an internal combustion engine, with a field coil through which a field current flows, for generating the exciter field, and having stator coils, in which by flux changes alternating voltages are induced that generate currents that are carried via rectifiers to the consumers, the regulator delivers the field current to the field winding of the generator, and in selectable generator rpm ranges the field current remains unregulated, so that the generator then operates in the free mode, and a voltage converter converts the free voltage then furnished by the generator to predeterminable values, and the transition from the free generator mode with an unregulated field current to the regulated generator mode is dictated by the regulator, and the operating parameters required for selecting the operating mode are delivered to the regulator, and the regulator outputs the requisite trigger signals.

5. A method for regulating a generator, in particular a three-phase generator, which can be driven by an internal combustion engine, with a field coil through which a field current flows, for generating the exciter field, and having stator coils, in which by flux changes alternating voltages are induced that generate currents that are carried via rectifiers to the consumers, the regulator delivers the field current to the field winding of the generator, and in selectable generator rpm ranges the field current remains unregulated, so that the generator then operates in the free mode, and a voltage converter converts the free voltage then furnished by the generator to predeterminable values, and during the generator mode with regulated field current, the voltage converter is bypassed.

6. A method for regulating a generator, in particular a three-phase generator, which can be driven by an internal combustion engine, with a field coil through which a field current flows, for generating the exciter field, and having stator coils, in which by flux changes alternating voltages are induced that generate currents that are carried via rectifiers to the consumers, the regulator delivers the field current to the field winding of the generator, and in selectable generator rpm ranges the field current remains unregulated, so that the generator then operates in the free mode, and a voltage converter converts the free voltage then furnished by the generator to predeterminable values, and the generator is operated in the free mode at low rpm, and the voltage output is raised to on-board electrical voltage in the DC/DC converter wired as a step-up converter, and at higher rpm a transition to a regulated mode is made.

7. A method for regulating a generator, in particular a three-phase generator, which can be driven by an internal combustion engine, with a field coil through which a field current flows, for generating the exciter field, and having stator coils, in which by flux changes alternating voltages are induced that generate currents that are carried via rectifiers to the consumers, the regulator delivers the field current to the field winding of the generator, and in selectable generator rpm ranges the field current remains unregulated, so that the generator then operates in the free mode, and a voltage converter converts the free voltage then furnished by the generator to predeterminable values, the generator is operated exclusively in the free generator mode, and the generator output voltage in the low rpm range is raised and in the high rpm range is lowered, the voltage conversion being effected with the aid of a voltage converter which operates as a step-up converter and/or as a step-down converter.

8. A method for regulating a generator, in particular a three-phase generator, which can be driven by an internal combustion engine, with a field coil through which a field current flows, for generating the exciter field, and having stator coils, in which by flux changes alternating voltages are induced that generate currents that are carried via rectifiers to the consumers, the regulator delivers the field current to the field winding of the generator, and in selectable generator rpm ranges the field current remains unregulated, so that the generator then operates in the free mode, and a voltage converter converts the free voltage then furnished by the generator to predeterminable values, and an unwound generator is used, whose output voltage is constantly above the on-board electrical voltage, and the voltage furnished by the generator is reduced, independently of the generator rpm, with the aid of the direct voltage converter acting as a step-down converter.

* * * * *